United States Patent
Prasad et al.

(10) Patent No.: US 6,823,061 B2
(45) Date of Patent: Nov. 23, 2004

(54) METHOD AND SYSTEM USING SS7 SIGNALING CONTROL CONNECTION PART (SCCP) IN A DISTRIBUTED NETWORK HAVING SHARED POINT CODES

(75) Inventors: Shyamal Prasad, Dallas, TX (US); Jeffrey Lucak, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 460 days.

(21) Appl. No.: 10/028,205

(22) Filed: Dec. 20, 2001

(65) Prior Publication Data

US 2003/0118001 A1 Jun. 26, 2003

(51) Int. Cl.[7] .............................. H04L 12/66; H04J 3/12; H04M 7/00
(52) U.S. Cl. ................. 379/230; 370/352; 370/401; 370/524; 379/221.08; 379/221.14
(58) Field of Search .................. 370/352, 353, 370/400, 401, 467, 522, 524; 379/219, 220.01, 221.08, 221.09, 221.1, 221.14, 230

(56) References Cited

U.S. PATENT DOCUMENTS

| | | | | | |
|---|---|---|---|---|---|
| 5,440,626 | A | * | 8/1995 | Boyle et al. | 379/219 |
| 5,454,034 | A | * | 9/1995 | Martin | 379/230 |
| 5,680,437 | A | * | 10/1997 | Segal | 379/15.01 |
| 6,487,286 | B1 | * | 11/2002 | Reaves et al. | 379/221.1 |
| 6,515,985 | B2 | * | 2/2003 | Shmulevich et al. | 370/356 |
| 6,522,741 | B1 | * | 2/2003 | Crowl | 379/207.11 |
| 6,678,242 | B1 | * | 1/2004 | Simon | 370/218 |
| 2002/0131427 | A1 | * | 9/2002 | Niermann | 370/401 |

* cited by examiner

*Primary Examiner*—Harry S. Hong

(57) ABSTRACT

The invention provides a method, system and device for increasing the efficiency of distributed networks and for enabling SS7-over-IP signaling gateways to share point codes without loss of SS7 functionality. The invention provides for communication among SS7 and IP elements of a distributed network through IP signaling gateways adapted to share point codes. Included is the support of Signaling Connection Control Part (SCCP) management functions across the distributed network system. Authoritative and non-authoritative network elements are used to manage subsystem status and SCCP message routing.

32 Claims, 2 Drawing Sheets

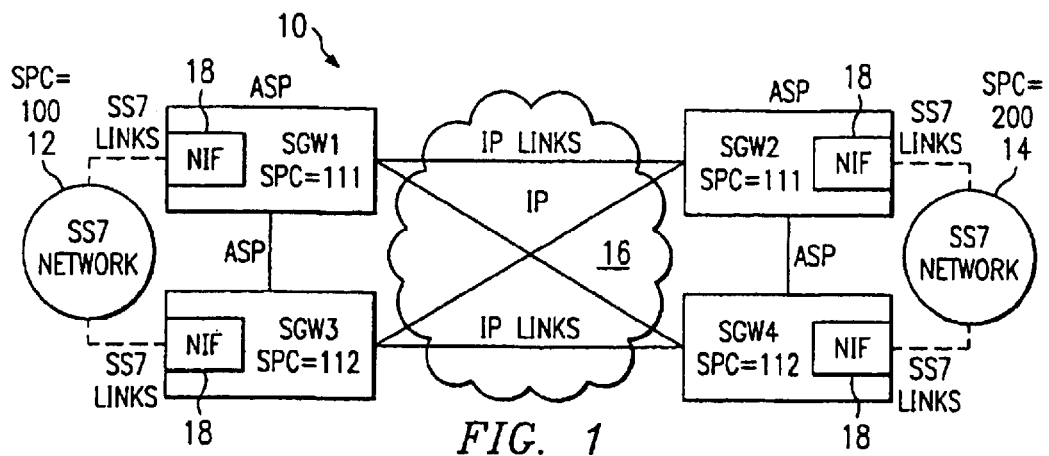
FIG. 1
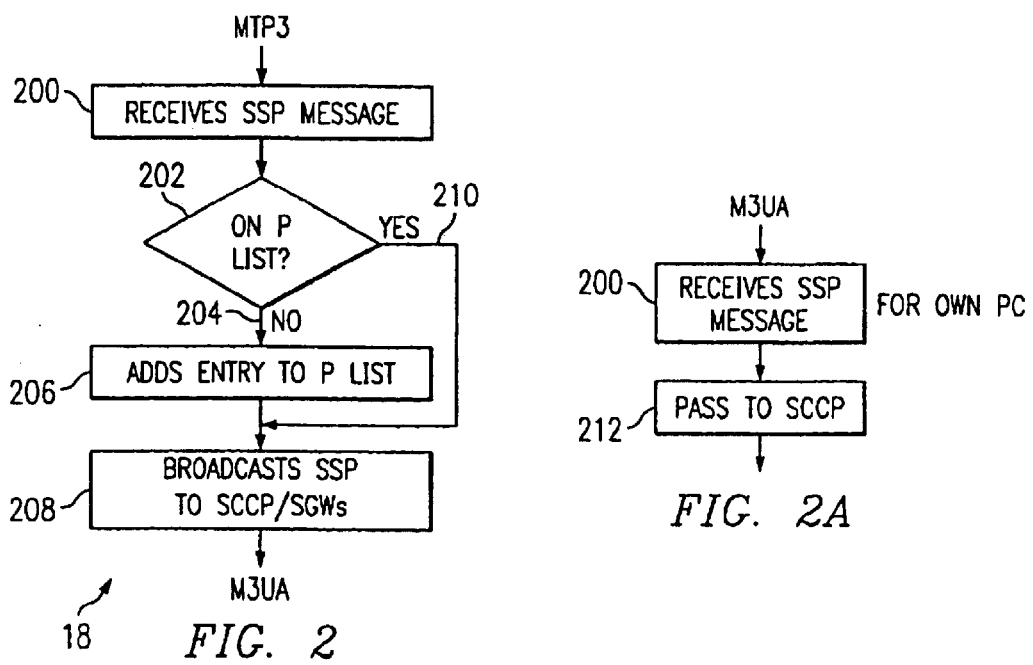
FIG. 2
FIG. 2A

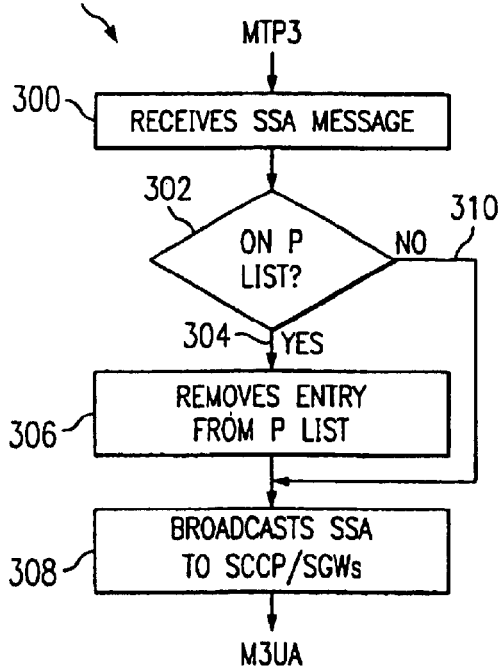
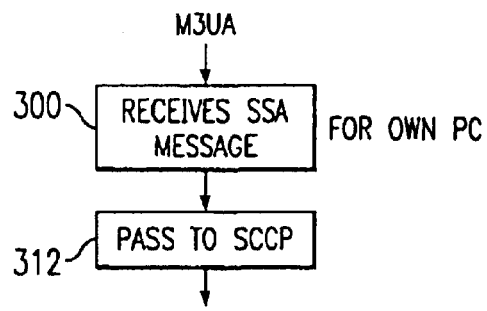
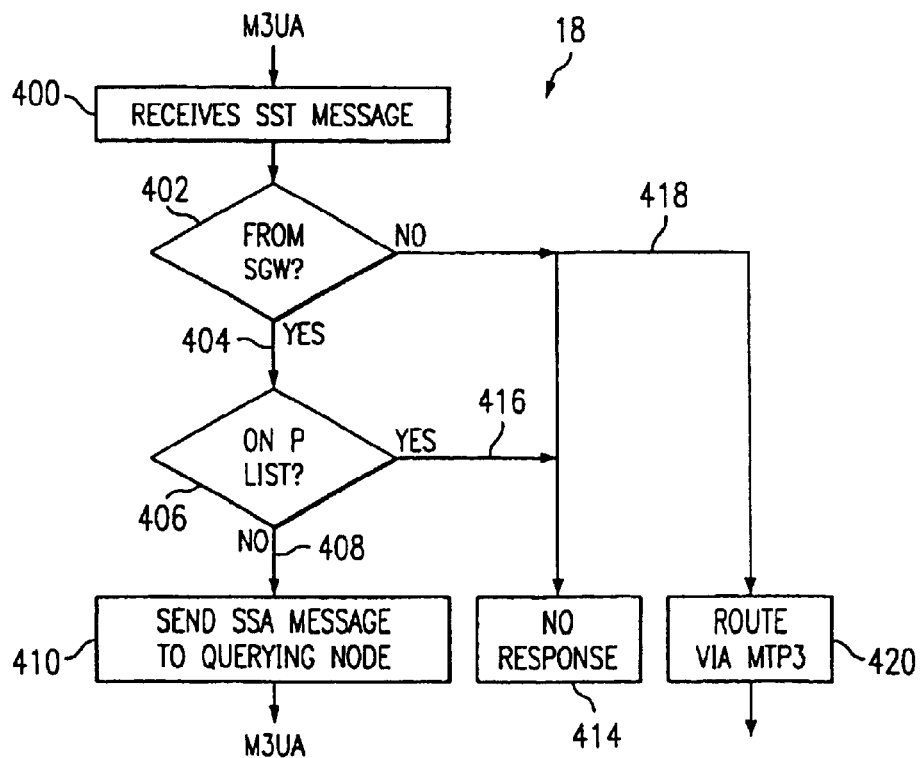

METHOD AND SYSTEM USING SS7 SIGNALING CONTROL CONNECTION PART (SCCP) IN A DISTRIBUTED NETWORK HAVING SHARED POINT CODES

TECHNICAL FIELD

The present invention relates in general to communications using Internet Protocol (IP) to share the load of Signaling System 7 (SS7) traffic in a distributed network. More particularly, the invention relates to transporting SS7 signaling traffic over an IP network using shared point codes without impeding SS7 Signal Control Connection Part (SCCP) functionality.

BACKGROUND OF THE INVENTION

Internet Protocol (IP) has become a popular communications standard enjoying wide deployment and use. For example, the internet is now a worldwide network of communications equipment and service providers which use IP as a common signaling protocol for communicating. On the internet, messages are transmitted from one user to another over a vast infrastructure of routers, servers, gateways and communication devices. Typically, users on either end of the network operate computers equipped with appropriate software and equipment. The underlying link level protocols handle the messaging functions on both ends of the communication channel.

A popular protocol choice for telephony is a form of common channel signaling called Signaling System number 7 (SS7), which is a global standard for telecommunications defined by the International Telecommunication Union (ITU) and specifically the Telecommunications Standardization Section of the ITU (ITU-T). While IP networks communicate using flexible and easily modifiable connections, SS7 uses a dedicated network to carry signaling traffic. In essence, the SS7 standard defines the procedures and protocols by which network elements in the public switch telephone network (PSTN) exchange information over a digital signaling network including wireless (e.g. cellular), and wireline call setup, routing and control. The ITU definition of SS7 allows for variance of the procedures and protocols such as those promulgated by the American National Standards Institute (ANSI) and Bell Communications Research (Bellcore) standards used in North America as well as the European Telecommunication Standards Institute (ETSI) standards used in Europe.

Essentially, an SS7 network and the defined protocols are used for implementing call signaling functions including basic call setup management and tear down. In addition, SS7 specifies various wireless services such as personal communication services (PCS), wireless roaming and mobile subscription authentication. Recently, the SS7 protocol has been used for local number portability (LNP) as well as toll free and toll wireline services. Other services that benefit from the SS7 protocol include enhanced call features such as call forwarding, calling party name and number display and three way calling as well as a wide array of emerging applications standards that provide for efficient and secure worldwide telecommunication.

With an SS7 network, messages are exchanged between network elements over 56 or 64 kilobits per second (kbps) using bi-directional channels called signaling links. Signaling occurs-out-of-band on dedicated channels rather than in-band on voice channels. Compared to in-band signaling, out-of-band signaling provides faster call setup times, more efficient use of voice circuits, and support for intelligent network services which require signaling to network elements without voice trunks. In addition, out-of-band signaling provides for improved control over fraudulent network use.

Currently, SS7 requires a dedicated network for the transport of signaling traffic. Due to the high cost of building SS7 networks there is a strong motivation to use alternative, cheaper technology like Internet Protocol (IP) to using IP networks to carry SS7 traffic. In particular, the IETF SIGTRAN working group has developed a suite of protocols to carry SS7 traffic over an IP network. The M3UA (MTP3 User Adaptation) protocol, in particular, can be used to carry MTP3 level SS7 traffic transparently over an IP network. In this usage, a Signaling Gateway (SGW) network element is used to convert MTP3 traffic running over SS7 links into M3UA traffic over an IP network.

In particular, an IP network can be used to replace a large SS7 transit network at a lower cost. In this scenario, SS7 network elements are each connected to an SS7 Gateway, and SS7 Gateways communicate with each other over IP. The SS7 network elements communicate with each other using standard SS7 protocols, the SS7 Gateways transparently route the messages over IP. These SS7 Gateways then become "STP replacement gateways" in the sense that they perform the role of a traditional SS7 Signal Transfer Point (STP). One example of such a system is "SS7 Transport Over IP," available from Ericsson, Inc.

A problem faced by non-ANSI SS7 network operators is a shortage of available point codes. This is directly related to the small point code field allowed in ITU networks: 14 bit point codes allow only 16384 distinct point codes. With SS7 transport over IP, it is possible for the signaling gateway nodes to "share" the same point code on opposite side of the IP network. The SS7 nodes on each side of the IP network see the shared point code gateways as one virtual STP that happens to be geographically distributed.

A specific problem with point code sharing arises with the use of the SS7 SCCP protocol. SCCP has a management function which tracks the availability of SCCP functions in the network. When point codes are shared, the SCCP protocol has no way to keep the SCCP management functions updated in all SS7 gateways that share point codes, since the SS7 protocols were not designed to work when a point code has been reused, and the SCCP functionality is thus replicated. Since SS7/SCCP does not include the concept of point code reuse, the protocol is effectively unusable. Since SCCP is used to provide global title translation (GTT), a crucial function in SS7 networks, this could be considered a severe drawback of the point code sharing scheme.

What is needed in the art is a solution that enables a set of SS7 over IP Signaling Gateways to share point codes while continuing to provide global title translation functions.

SUMMARY OF THE INVENTION

In general, the present invention provides a method, system and device for increasing the efficiency of distributed networks and for enabling SS7-over-IP signaling gateways to share point codes without loss of SS7 functionality.

According to one aspect of the invention, a method is provided for use in a distributed network system using SS7 elements that communicate over an IP (Internet Protocol) network through IP signaling gateways adapted to share point codes. The method includes the support of Signaling Connection Control Part (SCCP) management functions across the distributed network system. Steps include transmission of a status query message to an SS7 element by a non-authoritative signaling gateway and receipt of the status query message at an intervening authoritative signaling gateway. The authoritative signaling gateway responds to the status query message including an indication of one or more subsystems in the system which are allowed or prohibited as reported by the SCCP management functions of an SS7 element of the system.

According to preferred embodiments of the invention, Global Title Translation (GTT) functionality is provided to an IP signaling gateway.

According to another aspect of the invention, a telecommunications system for supporting Signaling Connection Control Part (SCCP) management functions in a distributed network using shared point codes is provided. Subsystems in a distributed network are adapted to send status indications to elements of the network. The system is configured to transmit status queries and responses among SS7 and IP gateways of the distributed network.

According to yet another aspect of the invention, an SS7 system manager is provided for use in a distributed network. A plurality of SS7 signaling gateways are configured to support sharing of point codes across an Internet Protocol (IP) network. At least one authoritative SS7 signaling gateway is adapted to transmit Signaling Connection Control Part (SCCP) management functions of subsystems for receipt by a Network Interface Function (NIF), defined in the M3UA protocol known in the art. The NIF is adapted to receive SCCP management functions from the authoritative SS7 gateway and for broadcasting notification of subsystem state changes to the plurality of SS7 signaling gateways across the IP network. Preferably a subsystem table is also provided and is updateable by the NIF for storing indications of subsystem states.

The invention provides several technical advantages including enabling gateways with shared point codes to continue to provide Global Title Translation (GTT) functions. An additional advantage is that standard SCCP protocol stacks may be used to support shared point codes and IP network interworking. Moreover, shared point code gateways are enabled to correctly interwork with existing SCCP management functions in the SS7 portion of a distributed network and the SS7 nodes are able to receive correct SCCP management responses even though the point codes are being shared.

BRIEF DESCRIPTION OF THE DRAWINGS

The above features and advantages of the present invention will be more clearly understood from consideration of the following detailed description in connection with the accompanying drawings in which:

FIG. 1 is a block diagram Illustrating how the invention is used in a point code sharing distributed network;

FIG. 2 is a process flow diagram showing an example of message routing according to the invention;

FIG. 2A is a process flow diagram showing an example of message routing according to the invention;

FIG. 3 is a process flow diagram illustrating the handling of an SS7 MTP3 Subsystem Allowed (SSA) message;

FIG. 3A is a process flow diagram showing an example of message routing according to the invention; and FIG. 4 is a process flow diagram illustrating the handling of an M3UA Subsystem Test (SST) message from an IP node.

Corresponding numerals and symbols in the different figures refer to corresponding parts unless otherwise indicated.

DETAILED DESCRIPTION OF PREFERRED EMBODIMENTS

In a communications network with SS7 signaling over IP special handling of Signaling Connection Control Port (SCCP) Management (SCMG) messages is done by the Network Interface Function (NIF) to enable correct SCCP management in an Signaling Transfer Point (STP) replacement network using point code conversion. This special handling allows all the SGW STPs in the network to maintain correct SCCP subsystem states, even though SCCP subsystem status or test messages may be sent to different STP nodes which share the same point code.

FIG. 1 is a block diagram showing an overview of a distributed network 10 capable of using the invention. Two representative SS7 network nodes are shown denoted by reference numerals 12 and 14. It will be understood by those skilled in the art that an actual communication network would exist on a much larger scale with much more numerous nodes and connections. The location of the nodes shown are merely for convenience in illustrating the inventive concepts and are not representative of any geographical restrictions of the invention. In the figures, SS7 links are shown by dashed connecting lines and IP links are shown by solid connecting lines. Four Signaling Gateways, SGW1, SGW2, SGW3, and SGW4 are shown mutually connected by an IP network 16. All nodes in the distributed network 10 have a Signaling Point Code (SPC), also referred to as a point code. As can be seen in FIG. 1, SS7 nodes 12 and 14 each have a unique point code, SPC100 and SPC200, respectively. A single point code is shared by SGW1 and SGW2, however, i.e., SPC111. Similarly, SGW3 and SGW4 share point code SPC112. This is possible since the Signaling Gateways, SGW1-SGW4, are provided with the capability of converting MTP3 traffic from the SS7 links into MP3UA traffic for use over the IP links. The Network Interface Function (NIF) is a function known in the art for use in an SS7 protocol stack to implement SS7-over-IP functionality. Preferably, a Network Interface Function (NIF) 18 is configured with this conversion capability. For example, SS7 node 12, addressed at SPC100, can communicate with SS7 node 14, addressed at SPC200, via either SPC111 or SPC112. The fact that SPCs are shared by two or more SGWs is preferably transparent to the SS7 nodes.

In an STP replacement network utilizing point code conservation, there are no resident local user parts in the SGW aside from the SCCP layer. The Transactional Capabilities Application Part (TCAP) relay application is turned off, and the local SCCP layer has no local subsystems. The primary function of the SCCP layers in an STP replacement network using point code conservation is to perform Global Title Translation (GTT). The SCCP management procedures described are subject to these constraints for proper handling of SCCP management procedures. It should be understood that the systems and methods described are only applicable if the SGW configuration data indicates that the SGW is part of an STP replacement network using point code conservation.

In general, the invention provides an improved Network Interface Function (NIF) for implementation in an SS7 Signaling Gateway in such a way as to allow the SGWs to continue to provide Global Title Translation (GTT) functions while the point codes are shared. The invention also allows the shared point code SGWs to continue to provide the correct SCCP management functionality towards the SS7 elements.

Subsystems in the network can have an enabled state, indicating availability to nodes of the network, or a prohibited state, indicating unavailability. Indicators of subsystem states are given in the form of a Subsystem Allowed (SSA) message and a Subsystem Prohibited (SSP) message.

For the purposes of the disclosure, the term "authoritative" Signaling Gateway (SGW) is ascribed to a SGW connected to an SS7 node over only one or more SS7 links with no intervening IP network elements. For example, in FIG. 1, SGW2 with point code 111 is an authoritative SGW for point code SPC200, but not for point code SPC100, which is one IP network hop away. The authoritative SGW keeps the SCCP state of a linked subsystem updated by having the network interface function NIF monitor Subsystem Allowed (SSA)/Subsystem Prohibited (SSP) SCCP messages coming in from the SS7 network. When the NIF receives such a message, whose destination is its own point code, and detects a state change it updates its subsystem tables, it broadcasts the state change to all the other SS7 gateways it is connected to via the IP network (i.e., over M3UA), and it passes the message up to the SCCP stack for normal processing.

Signaling Gateways (SGWs) that receive SCCP management messages from the IP network are referred to herein as "non-authoritative," receiving SCCP management messages from an SS7 element that is not directly accessible via an SS7 link. For example, in FIG. 1, SGW2 is non-authoritative with respect to SPC100, used by SS7 node 14. When non-authoritative SGWs receive an SSA/SSP message from the IP network whose destination is its own point code (i.e., from an authoritative SGW on the other side of IP network) it passes the message to the local SCCP for normal processing.

In addition to the SSA and SSP messages, the network includes Subsystem Test (SST) messages. When an SST message arrives at an SGW via SS7 (MTP3) it is routed to the SCCP function of the destination point code. When an SST message arrives via IP and originates from an SS7 gateway, the NIF answers based on its own state tables. If the NIF tables do not indicate the subsystem as being in a prohibited state, e.g. by a previously-received SSP message, then the NIF returns an SSA message regarding that subsystem, otherwise no reply is sent.

The operation of the invention is illustrated in more detail by the following examples. In general, if the NIF receives an SCCP subsystem prohibited (SSP) or SCCP subsystem allowed (SSA) message via an SS7 link using MTP3 destined for the SGW's own point code, then the NIF is considered an "authority" for the SCCP subsystem status for that point code. As an authority, the NIF can keep track of the subsystem state and generate response messages to SCCP subsystem test (SST) messages received from the other, non-authoritative SGW STP's (via M3UA).

If the NIF receives an SSP or SSA message from M3UA destined for the SGW's own point code, then the NIF is not an "authority" for the point code, and is merely being informed by the authoritative NIF in another SGW of the subsystem status change. In this case, the NIF forwards the status message up to the local SCCP layer.

If the NIF receives an SSP or SSA message which is not destined for the SGW's own point code, and has not been originated by an SGW STP peer node, then the message is treated as a regular user part transfer message and routed accordingly as known in the art (FIGS. 2A, 3A). Otherwise, the message is preferably routed according to the systems and methods described herein.

With reference to the process flow diagram of FIG. 2, an example of the operation of the invention is shown. When the NIF 18 receives an SSP message from an SS7 node via MTP3 as indicated by step 200, the NIF checks to see if the affected Point Code (PC) and Subsystem Number (SSN) are listed in a prohibited subsystems list, as shown by decision diamond 202. If the PC and SSN are not on the prohibited system list, following decision path arrow 204, the NIF adds an entry to the prohibited subsystems list for the affected PC and SSN (step 206). In step 208, the NIF then broadcasts the SSP to the resident local SCCP layer and all other SGW STPs in the network via M3UA using network IP resources. If the PC and SSN are already in the prohibited subsystems list, as shown by arrow path 210, then the NIF proceeds directly to step 208 and broadcasts the SSP to the resident local SCCP layer and all other SGW STPs in the network (via M3UA).

The example of FIG. 3 illustrates the NIF 18 receipt of an SSA message from MTP3 (step 300). The NIF checks to see if the affected PC and SSN are in the prohibited subsystems list (step 302). Following decision arrow path 304, if the PC and SSN are on the prohibited subsystems list, then the NIF removes the entry from the prohibited subsystems list for the affected PC and SSN (step 306). The NIF then broadcasts the SSA to the resident local SCCP layer and all other SGW STPs in the network via M3UA (step 308). If the PC and SSN are not on the prohibited subsystems list (arrow path 310), then the NIF broadcasts the SSA to the resident local SCCP layer and all other SGW STPs in the network via M3UA.

FIG. 4 depicts an example of the NIF 18 receiving an SST message from an IP node via M3UA, which has been originated by an SGW peer node (step 400). The NIF checks to see if the message is from its own SGW (decision diamond 402). If so (arrow path 404), the NIF checks the prohibited subsystems list for the affected PC and SSN (step 406). If the PC and SSN are not on the prohibited subsystem list, as indicated by arrow path 408, then the SSA message is sent to the querying node (step 410). Returning to decision diamond 406, if the PC and SSN are on the prohibited subsystem list (arrow path 416), then no reply is sent to the querying node (step 414). Referring again to decision diamond 402, preferably, upon receipt in the NIF 18 of an SSP or SSA message from the IP network link, via M3UA, not from the SGW's own point code (arrow path 418), then no response is generated (box 414) and the NIF forwards the message to the resident local SCCP layer via MTP3 (step 420).

Thus, the invention provides systems and methods by which a distributed network using shared point codes among SS7 and IP nodes is configured to permit the NIF to track subsystem states independently of SCCP and to use predetermined "authoritative" gateways for communicating the SCCP status of any specific subsystem of the network. The invention provides means by which shared point codes can be used in the distributed network with increased efficiency and without loss of SS7 functionality. While the invention has been described with reference to illustrative embodiments, this description is not intended to be construed in a limiting sense. Various modifications and combinations of the illustrative embodiments as well as other embodiments of the invention will be apparent to persons skilled in the art upon reference to the description and claims.

We claim:

1. In a distributed network system using SS7 elements that communicate over an IP (Internet Protocol) network through IP signaling gateways adapted to share point codes, a method of supporting Signaling Connection Control Part (SCCP) management functions across the system, comprising the steps of:
- a non-authoritative signaling gateway transmitting a status query message to an SS7 element;
- receiving the status query message at an intervening authoritative signaling gateway; and
- the authoritative signaling gateway responding to the status query message;
- wherein a response to the status query message includes an indication of one or more subsystems in the system which are allowed or prohibited as reported by the SCCP management functions of an SS7 element of the system.

2. The method according to claim 1, further comprising the step of the SCCP management functions using a Network Interface Function (NIF) to report whether the subsystems are allowed or prohibited.

3. The method according to claim 2, further comprising the step of the NIF employing the SCCP management functions to allow the IP signaling gateways to track indications of subsystems wherein the system is configured for subsystems to send indications to different gateways which share a point code.

4. The method according to claim 2, further comprising the step of designating the NIF authoritative over a point code associated with the authoritative signaling gateway upon NIF receipt of a reported indication of the subsystems from a Message Transfer Part-3 Layer (MTP3).

5. The method according to claim 4, further comprising the steps of:
- tracking the indication of the subsystems using the NIF; and
- the NIF generating a response message of the reported state indications to other gateways in the system.

6. The method according to claim 2, further comprising the steps of:
- the NIF receiving a reported indication of a subsystem in the network from a Message Transfer Part 3—User Adaption Layer (M3UA); and
- designating the NIF as non-authoritative over a point code associated with the authoritative signaling gateway.

7. The method according to claim 6, further comprising the step of the NIF forwarding the indication of the subsystem to a local SCCP layer.

8. The method according to claim 1, further comprising the step of using a subsystem allowed (SSA) message of the SCCP management functions to indicate whether the subsystems in the network are allowed.

9. The method according to claim 1, further comprising the step of using a subsystem prohibited (SSP) message of the SCCP management functions to indicate whether the subsystems in the network are prohibited.

10. The method according to claim 1, further comprising the step of an authoritative gateway transmitting the reported indication of a subsystem to a non-authoritative gateway.

11. The method according to claim 1, further comprising the step of storing the reported indication of a subsystem in a routing table.

12. The method according to claim 11, further comprising the step of associating the routing table with a Network Interface Function (NIF).

13. The method according to claim 1, further comprising the step of tracking the indication of subsystems in the system independently of the SCCP management functions.

14. The method according to claim 1, further comprising the step of indicating a state change of a subsystem when transmitting the status query message.

15. The method according to claim 1, further comprising the step of providing Global Title Translation (GTT) functions to an IP signaling gateway.

16. A telecommunications system for supporting Signaling Connection Control Part (SCCP) management functions in a distributed network using shared point codes, comprising:
- one or more subsystems in the distributed network, each subsystem adapted to send an indication of its status to elements of the distributed network;
- a first plurality of signaling gateways having at least one non-authoritative signaling gateway adapted to transmit a status query message to an SS7 element of the distributed network; and
- a second plurality of signaling gateways, having at least one authoritative signaling gateway adapted to receive and respond to the status query message.

17. The system of claim 16 wherein at least one authoritative signaling gateway is adapted to include in a response to the status query message, an indication of subsystems in the network which are allowed or prohibited as reported by the SCCP management functions of the distributed network.

18. The system according to claim 16, wherein at least one of the signaling gateways comprises an Internet Protocol (IP) signaling gateway.

19. The system according to claim 16, wherein the IP signaling gateways are adapted to share SS7 point codes.

20. The system according to claim 16, wherein the IP signaling gateways are adapted to execute Global Title Translation (GTT) functions.

21. The system according to claim 16, wherein the SCCP management functions further comprise a Network Interface Function (NIF) for reporting whether the subsystems in the network are allowed or prohibited.

22. The system according to claim 16, wherein the first plurality of signaling gateways of the distributed network are communicably coupled by an IP network with the second plurality of signaling gateways.

23. The telecommunications system according to claim 16, further comprising a storing mechanism for storing the reported indication of the subsystem in a routing table.

24. The telecommunications system according to claim 23, wherein the routing table is associated with a Network Interface Function (NIF).

25. An SS7 system manager for use in a distributed network, comprising:
- a plurality of SS7 signaling gateways configured to support sharing of point codes across an Internet Protocol (IP) network;
- at least one authoritative SS7 signaling gateway for transmitting a Signaling Connection Control Part (SCCP) management function of a subsystem;
- a Network Interface Function (NIF) for receiving the SCCP management function from the authoritative SS7 gateway and for broadcasting notification of subsystem state changes to the plurality of SS7 signaling gateways across the IP network; and
- a subsystem table updateable by the NIF for storing indications of subsystem states.

26. The system manager according to claim 25, wherein the NIF is adapted to monitor the state of subsystems independent of the SCCP management function.

27. The system manager according to claim 25, further comprising:
- a non-authoritative signaling gateway adapted to receive an allowed or prohibited indication; and wherein the SCCP management function is configured for determination of whether the received allowed or prohibited indication is broadcasted to other SS7 signaling gateways within the plurality of SS7 signaling gateways.

28. The system manager according to claim 25, wherein the NIF is adapted to transmit the allowed or prohibited indication to the SCCP management function.

29. The system manager according to claim 25, wherein the subsystem table is associated with the NIF.

30. The system manager according to claim 25, wherein the SS7 signaling gateways sharing point codes across the IP network are configured to provide Global Title Translation (GTT) functions.

31. The system manager according to claim 25, wherein the SCCP management function is configured to indicate with a subsystem allowed (SSA) message whether the subsystem in the network is allowed.

32. The system manager according to claim 25, wherein the SCCP management function is configured to indicate with a subsystem prohibited (SSP) message whether the subsystem in the network is prohibited.

* * * * *